(12) United States Patent
Tagawa et al.

(10) Patent No.: US 6,922,794 B2
(45) Date of Patent: Jul. 26, 2005

(54) MICROCOMPUTER WITH DEBUG SUPPORTING FUNCTION

(75) Inventors: Koutarou Tagawa, Kawasaki (JP); Kouj Arai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 648 days.

(21) Appl. No.: 09/960,519

(22) Filed: Sep. 24, 2001

(65) Prior Publication Data

US 2002/0184561 A1 Dec. 5, 2002

(30) Foreign Application Priority Data

May 31, 2001 (JP) ........................................ 2001-165397

(51) Int. Cl.⁷ ................................................ G06F 11/00
(52) U.S. Cl. ............................ 714/28; 714/22; 714/30; 714/31; 703/28
(58) Field of Search ............................ 714/22, 28, 30, 714/31; 703/28

(56) References Cited

U.S. PATENT DOCUMENTS 5,226,047 A * 7/1993 Catlin .......................... 714/28
5,283,905 A * 2/1994 Saadeh et al. ............... 713/324
5,935,266 A * 8/1999 Thurnhofer et al. ......... 714/726
6,044,476 A * 3/2000 Ote et al. ...................... 714/31
6,339,753 B1 * 1/2002 Nagatome ..................... 703/28
2002/0147939 A1 * 10/2002 Wenzel et al. ................ 714/30
2003/0074180 A1 * 4/2003 Shibayama et al. ........... 703/28

FOREIGN PATENT DOCUMENTS

JP 7-302213 11/1995
JP 2002358212 A * 12/2002 ........... G06F/11/22

* cited by examiner

Primary Examiner—Robert Beausoliel
Assistant Examiner—Michael Maskulinski
(74) Attorney, Agent, or Firm—Staas & Halsey LLP

(57) ABSTRACT

In the microcomputer, the debug target circuit and the debugging circuit with an interface module to the in-circuit emulator are independently supplied with drive powers. Drive power is supplied to the debug target circuit and the debugging circuit, and various debug information is set by the in-circuit emulator. Thereafter, only supply of drive power to the debug target circuit is stopped. While the various debug information is held at the debugging circuit, supply of drive power to the debug target circuit is restarted. The debugging just after power throw-in is performed based on the debug information held in the debugging circuit.

12 Claims, 10 Drawing Sheets

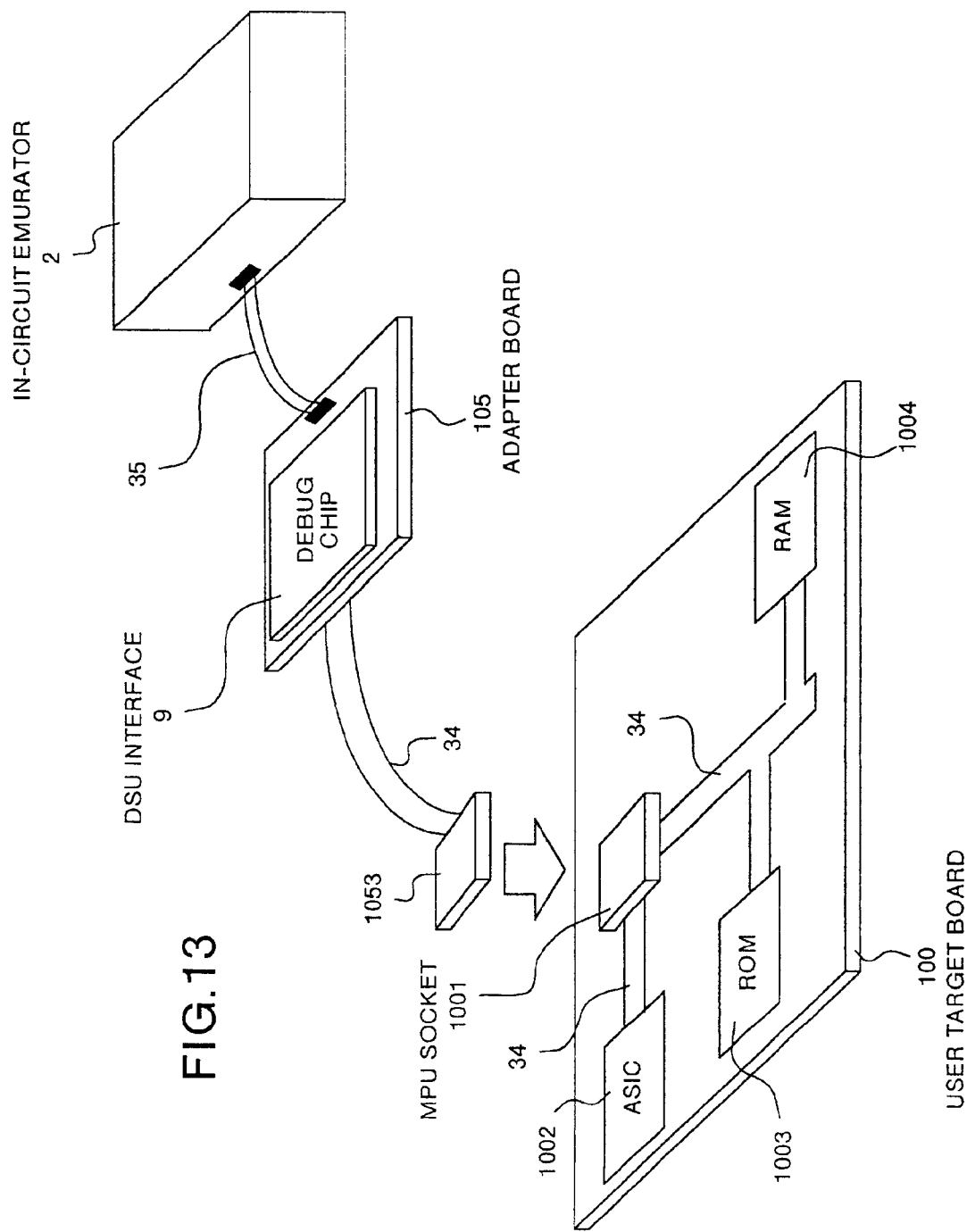

MICROCOMPUTER WITH DEBUG SUPPORTING FUNCTION

FIELD OF THE INVENTION

The present invention relates to a microcomputer with a debug supporting function in which a program to be executed by a CPU is debug by using an in-circuit emulator.

BACKGROUND OF THE INVENTION

Generally, the microcontroller and the microprocessor equipped with a CPU core (hereinafter collectively called "microcomputer") are categorized into a microcomputer to be applied to various actual products and the like for executing a program, as a so-called product version, and a microcomputer having a debug supporting function for debugging a program by using an in-circuit emulator, in addition to a function for executing the program.

FIG. 1 is a schematic block diagram of a conventional microcomputer with a debug supporting function ("debugging microcomputer"). The debugging microcomputer 1 has the CPU 11, debug support unit (DSU) 12, bus controller 13, and incorporated set of memories and peripherals 14. Further, the debugging microcomputer 1 has the dedicated bus 15 that connects the CPU 11 to the debug support unit 12, the command bus 16 that connects the CPU 11 to the bus controller 13, and the data bus 17 that connects the CPU 11 to the bus controller 13 and the incorporated set of memories and peripherals 14. The debug support unit 12 is connected is connected via a tool bus 18 to the in-circuit emulator 2. The bus controller 13 controls an external bus 19.

When debugging, the debug support unit 12 is connected to the in-circuit emulator 2, and the debugging microcomputer 1 is powered on. Various debug settings in the debug support unit 12 are initialized from the in-circuit emulator 2, to execute an actual program by the CPU 11.

In this conventional debugging microcomputer 1, however, the debug support unit 12 and the CPU 11 are supplied with drive power from an external common power supply. Therefore, even when such an attempt is desirable as tracing an action of the CPU 11 just after power throw-in or breaking a program at a head of an initializing routine, if the power is turned off, various debug setting information disappears, with a failure to perform a debug, as a problem.

There is known a method of performing a debug by a pseudo reproduction of actions of a target system including the debugging microcomputer 1 when power is turned on. That is a method of separating a power supply by inserting an adapter between the debugging microcomputer 1 and the target system as a target to be debugged, holding the debugging microcomputer 1 stopped by an external reset input with the power on, and canceling the rest input in synchronism with a re-throw-in of power of the target system. This method however is unable to reproduce an action of the CPU 11 in a transient phase just after power throw-in, resulting in an incomplete debug.

SUMMARY OF THE INVENTION

It is an object of the present invention to provide a debugging microcomputer that allows for a debug to be complete upon power throw-in by connection of an in-circuit emulator.

The debugging microcomputer according to one aspect of the present invention comprises a debug target circuit as a target of debug, and a debugging circuit having an interface module to an in-circuit emulator, and in which the debug target circuit and the debugging circuit are independently supplied with drive power. Thus, because of independent supply of drive power to the debug target circuit and the debugging circuit, the supply of drive power to the debug target circuit can be stopped, while keeping the debugging circuit active by supplying drive power to the debugging circuit.

Other objects and features of this invention will become apparent from the following description with reference to the accompanying drawings.

BRIEF DESCRIPTION OF THE DRAWINGS

FIG. 11 is a chart of sequential actions when the target system of FIG. 9 is powered on;

FIG. 13 is a schematic perspective view of an entire arrangement of the system of FIG. 9.

DESCRIPTION OF THE PREFERRED EMBODIMENTS

Figure 1:
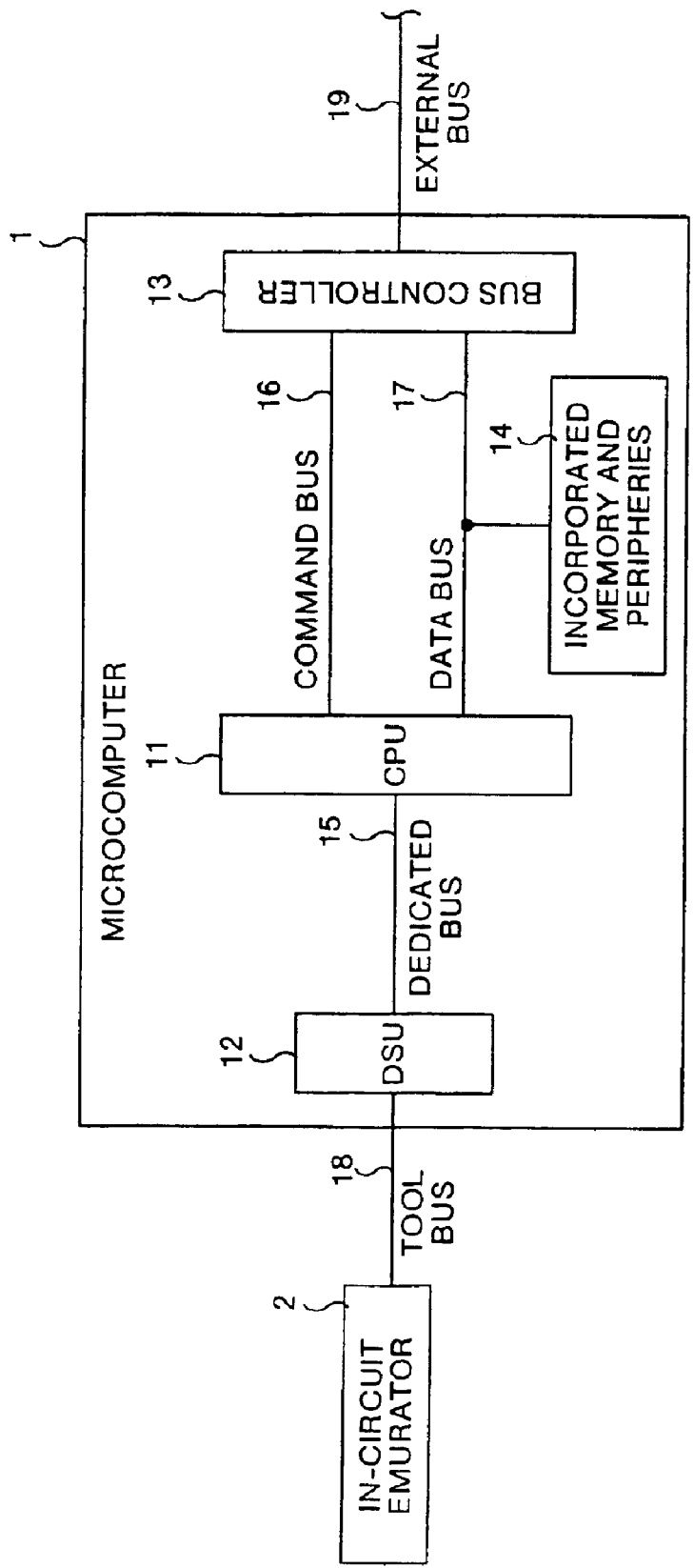
FIG. 1 is a schematic block diagram of a conventional debugging microcomputer.

Embodiment/s of the debugging microcomputer according to the present invention will be described below while referring to the accompanying drawings. In the figures, like members or elements are designated by like reference characters and their explanation is omitted in order to avoid simple repetition of explanation.

Figure 2:
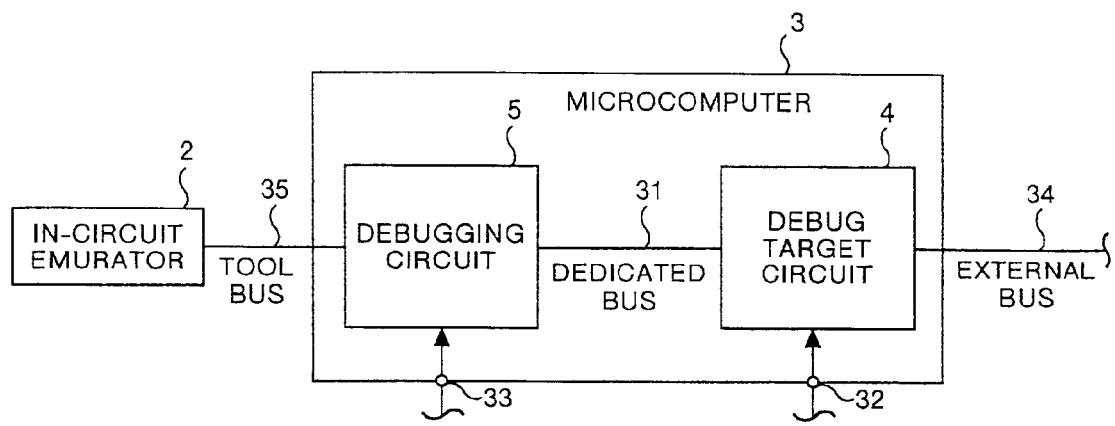
FIG. 2 is a schematic block diagram of a debugging microcomputer according to an embodiment of the invention.

FIG. 2 is a schematic block diagram of a debugging microcomputer according to an embodiment of the present invention. This debugging microcomputer 3 has the debug target circuit 4 as a target of debug, debugging circuit 5, and the dedicated bus 31 that connects the debug target circuit 4 to the debugging circuit 5. The dedicated bus 31 provides transmission and reception services such as of a tracing data and a break demand signal from an in-circuit emulator 2. The debug target circuit 4 has an external bus 34 connected thereto. The debugging circuit 5 is connected via the tool bus 35 to the in-circuit emulator 2.

The debugging microcomputer 3 further has the first power supply terminal 32 for supplying external drive power to the debug target circuit, and a second power supply terminal 33 for supplying external drive power to the debugging circuit 5. The first and second power supply terminals 32 and 33 are connected for example to power supplies separated from each other for independently supplying drive power therefrom. Therefore, in a condition with drive power supplied to the debugging circuit 5, the supply of drive power to the debug target circuit 4 can be stopped.

Figure 3:
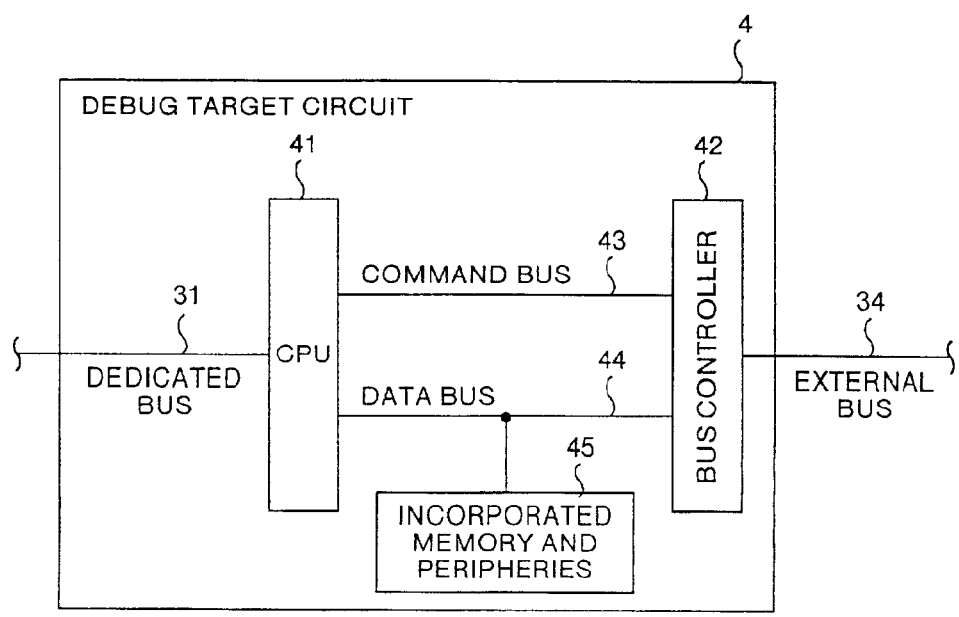
FIG. 3 is a schematic block diagram of a debug target circuit in the debugging microcomputer according to the invention.

FIG. 3 is a schematic block diagram of the debug target circuit 4. The debug target circuit 4 is constituted with the CPU 41 and the bus controller 42 mutually connected by the command bus 42 and the data bus 44. The incorporated set of memories and peripheral circuits 45 is also connected to the data bus 44. The CPU 41 is connected to the dedicated bus 31. This bus controller 42 is connected to the external bus 34.

Figure 4:
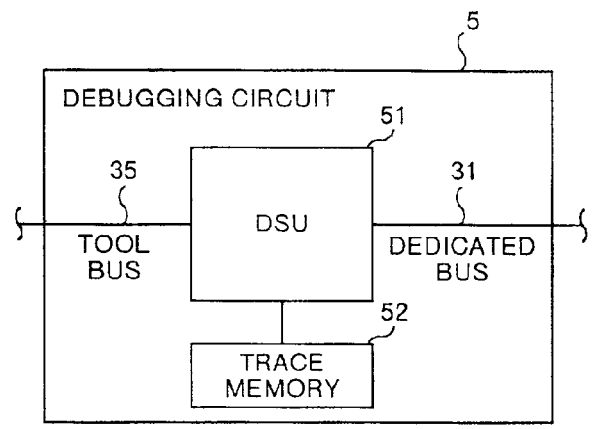
FIG. 4 is a schematic block diagram of a debugging circuit of the debugging microcomputer according to the invention.

FIG. 4 is a schematic block diagram of the debugging circuit 5. The debugging circuit 5 has the debug support unit 51 with a function as an interface module to the in-circuit emulator 2, and the trace memory 52 for writing such as of trace information supplied from the CPU 41 via the dedicated bus 31. The debug support unit 51 is connected to the dedicated bus 31 and the tool bus 35.

The debugging microcomputer 3 has a trace mode for executing a user program to output trace information therefrom to the in-circuit emulator 2. In the trace mode, the debug target circuit 4 executes the user program, for supply such as of associated bus action information to the debugging circuit 5 via the dedicated bus 31. The debugging circuit 5 performs a processing, such as of the bus action information supplied from the debug target circuit 4, to provide trace data. The trace data are sent via the tool bus 35 to the in-circuit emulator 2, or they are stored in a trace memory 52 in the debugging circuit 5.

Further, the debugging microcomputer 3 has an emulator mode for the in-circuit emulator 2 to set a break point to the user program, as well as for setting to the debugging circuit 5 necessary information for tracing the user program. In the emulator mode, the debugging circuit 5 reads an emulator program from the in-circuit emulator 2, and depends thereon to read, as well as initialize, contents of various memories and registers in the debug target circuit 4 via the dedicated bus 31.

The debugging microcomputer 3 with the above-noted arrangement is used for a debug work to be performed in the following procedures. First, the in-circuit emulator 2 is connected, and in the system startup, a power supply (not shown) for supplying drive power to the debug target circuit 4 and another power supply (not shown) for supplying drive power to the debugging circuit 5 are concurrently turned on. Thereby, debug related settings within the debugging circuit 5 are made by the in-circuit emulator 2. Then, the power supply for supplying drive power to the debug target circuit 4 is turned off, while keeping on the power supply for supplying drive power to the debugging circuit 5. Preparations for debug upon power throw-in have now been completed. Under this condition, the power supply for supplying drive power to the debug target circuit 4 is again turned on. Thereby, the CPU 41 of the debug target circuit 4 is caused to execute an initializing routine of the user program and the like. Then, the debug support unit 51 of the debugging circuit 5 is allowed by the debug settings preset by the debug support unit 51 to acquire a trace list for execution of the program, as well as to interrupt the program at the break point set within the initializing routine.

Figure 5:
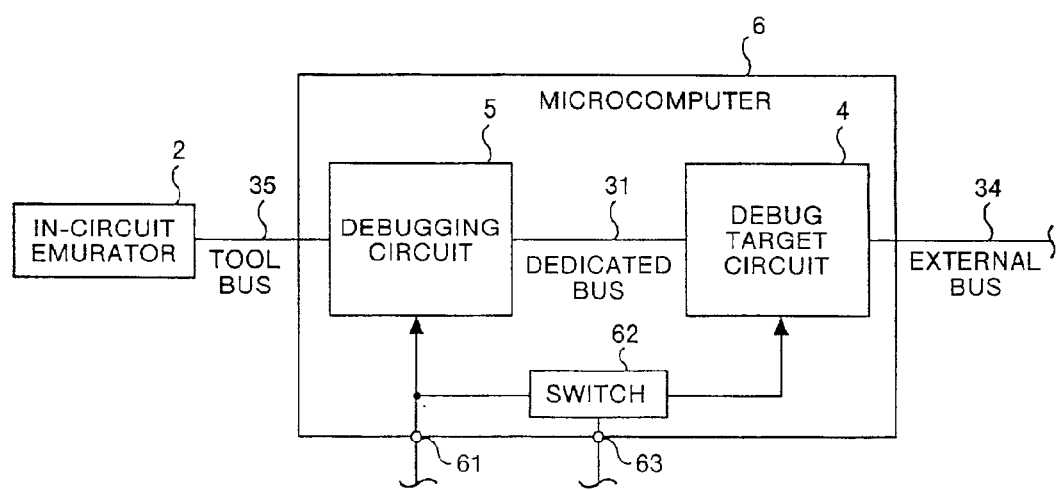
FIG. 5 is a block diagram of a debugging microcomputer according to another embodiment of the invention.

It is noted that, in place of driving the debug target circuit 4 and the debugging circuit 5 from independent power supplies as above-mentioned, like a debugging microcomputer 6 shown in FIG. 5, there may be provided a power supply terminal 61 common to a debug target circuit 4 and a debugging circuit 5, to thereby drive the debug target circuit 4 and the debugging circuit 5 from a common power supply. In this case, the debugging microcomputer 6 is additionally provided with a switching element 62 and a switch control terminal 63.

In the arrangement shown in FIG. 5, drive power supplied to the power supply terminal 61 is supplied via the switching element 62 to the debug target circuit 4. The switching element 62 is tuned on and off in dependence on an external control signal supplied via the switch control terminal 63. In other words, by a switching action of the switching element 62, supply and stop of drive power to the debug target circuit 4 are switched over. On the other hand, the drive power supplied to the power supply terminal 61 is supplied, directly or as it is, to the debugging circuit 5. Therefore, even by such an arrangement, supply of drive power to the debug target circuit 4 can be stopped, while the debugging circuit 5 is kept supplied with drive power.

Further, by the arrangement shown in FIG. 5, whole power supply terminals of the debugging microcomputer 6 can be commonly used within whole circuits of a chip. It therefore is unnecessary to distribute the whole power supply terminals provided in the chip between a group of power supply terminals for the debug target circuit and a group of power supply terminals for the debugging circuit.

Figure 6:
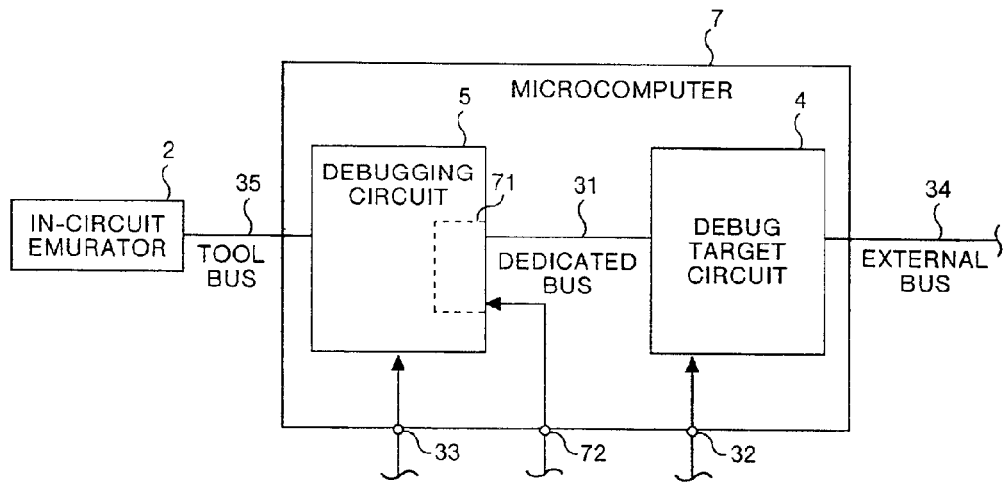
FIG. 6 is a block diagram of a debugging microcomputer according to another embodiment of the invention.

Still further, there may be employed an arrangement which, like a debugging microcomputer 7 shown in FIG. 6, has a clip circuit 71 for clipping a signal to be supplied from a debug target circuit 4 to a debugging circuit 5. The clip circuit 71 clips an output signal of the debug target circuit 4, when supply of drive power to the debug target circuit 4 is stopped. On the other hand, when drive power is supplied to the debug target circuit 4, the clip circuit 71 supplies the output signal of the debug target circuit 4, directly or as it is, to the debugging circuit 5. A switching of clip action of the clip circuit 71 may for example be based on a later-described external clip control signal to be supplied via a clip control terminal 72 provided to the debugging microcomputer 7, as shown in FIG. 6.

Figure 7:
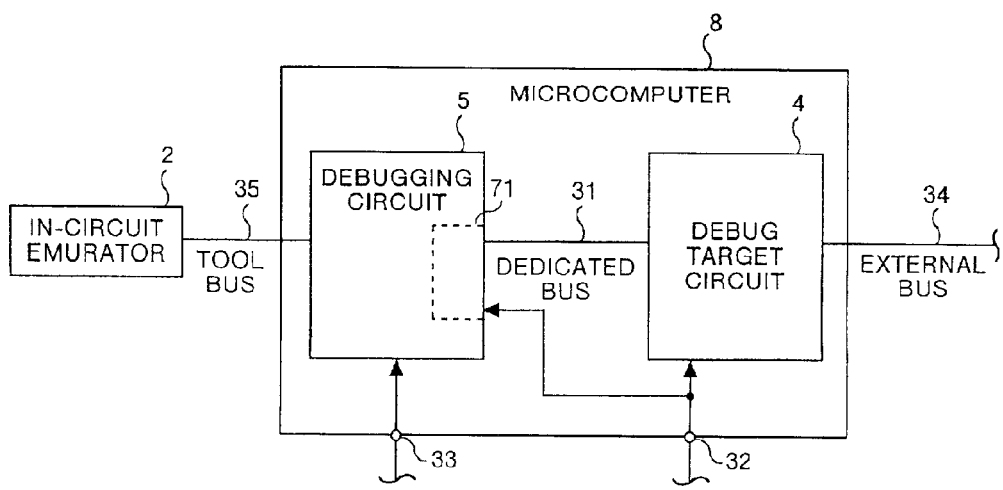
FIG. 7 is a block diagram of a debugging microcomputer according to another embodiment of the invention.

The clip control signal (not shown specifically) may for example be an abnormality detection signal output from a later-described power supply monitoring IC to be provided outside the debugging microcomputer 7 for monitoring a power supply employed for supplying drive power to the debug target circuit 4. Or alternatively, in place of the arrangement in which the clip circuit 71 is supplied with an external clip control signal, there may be employed, like a debugging microcomputer 8 shown in FIG. 7, a clip control signal derived from drive power to be supplied to a debug target circuit 4 within the microcomputer. According to the arrangement shown in FIG. 7, it is unnecessary to provide an external power supply monitoring IC.

Figure 8:
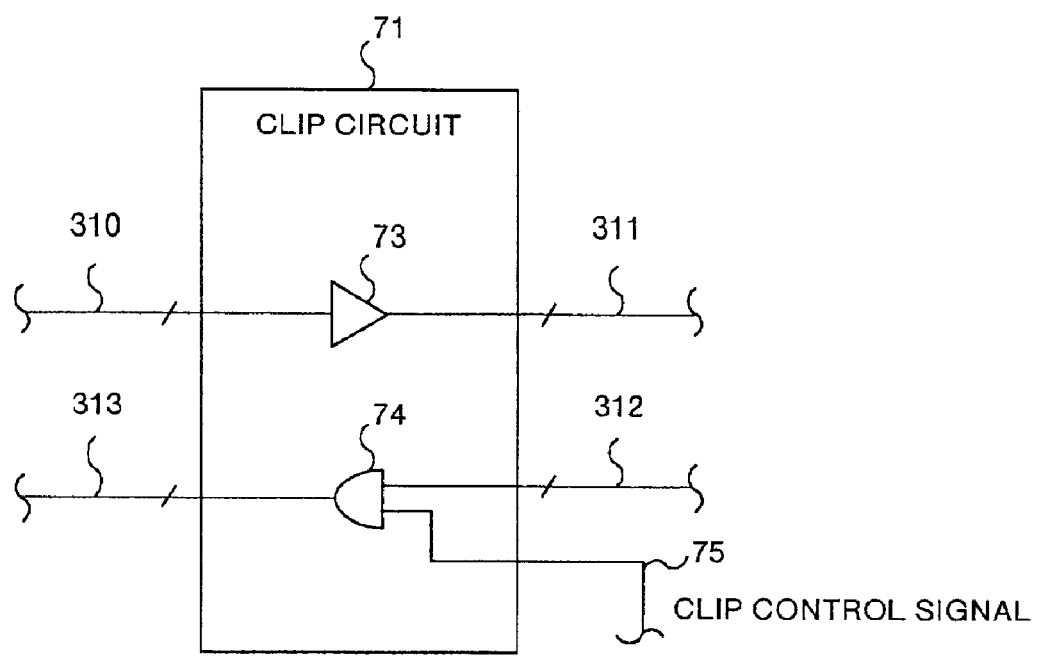
FIG. 8 is a schematic circuit diagram of a clip circuit of a debugging microcomputer according to another embodiment of the invention.

FIG. 8 is a schematic circuit diagram of a clip circuit 71 according to another embodiment of the invention. This clip circuit 71 has an output buffer 73 for buffering a signal to be supplied from a debugging circuit 5 to a debug target circuit 4. The clip circuit 71 further has a clip cell 74 formed by an AND gate for clipping a signal output from the debug target circuit 4 to be received by the debugging circuit 5. The output buffer 73 and the clip cell 74 are multiplied in number, as necessary for a number of dedicated buses 31 provided.

In FIG. 8, designated by reference character 311 is a respective one of various kinds of signals 310 output from the debugging circuit 5 and buffered by output buffers 73, among the dedicated buses 31 interconnecting the debugging circuit 5 and the debug target circuit 4; 313 is a respective one of various kinds of signals 312 subjected to clip cells 74 to be received by the debugging circuit 5, among the dedicated buses 31.

Figure 9:
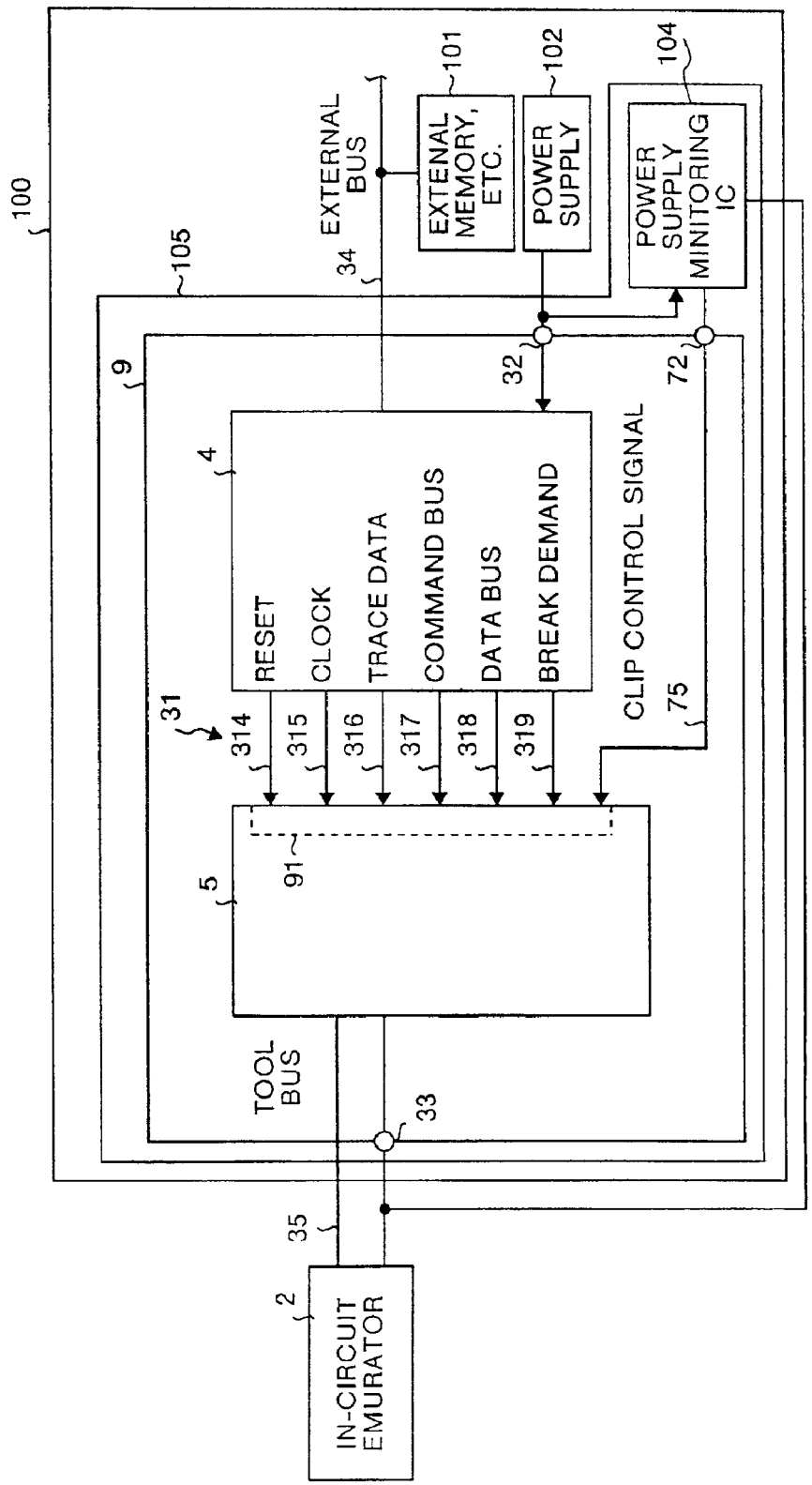
FIG. 9 is a block diagram of a target system with an applied debugging microcomputer according to another embodiment of the invention.

A target system will now be described to which a debugging microcomputer according to an embodiment of the invention is applied. FIG. 9 is a block diagram of the target system with an applied debugging microcomputer. In FIG. 9, designated by reference character 9 is the debugging microcomputer in which independent drive power is supplied to a debug target circuit 4 as well as to a debugging circuit 5, and 100 is the target system to be controlled by the debugging microcomputer 9. The target system 100 is connected to the debugging microcomputer 9 via an adapter board 105 which has a power supply monitoring IC. The target system 100 has an external memory 101 connected to an external bus 34. The target system 100 is driven to operate with drive power supplied by a power supply 102. Output power of the power supply 102 is supplied via a first power supply terminal 32 to the debug target circuit 4 in the debugging microcomputer 9. In other words, the debug target circuit 4 is driven to operate with drive power supplied from the power supply 102 of the target system 100.

The output power of the power supply 102 is monitored by the power supply monitoring IC. A result of the monitoring by the power supply monitoring IC is supplied as a clip control signal via a clip control terminal 72 to a clip circuit 91. On the other hand, the debugging circuit 5 is driven to operate with drive power supplied from an in-circuit emulator 2 via a second power supply terminal 33. The power supply monitoring IC also is supplied with drive power from the in-circuit emulator 2. Therefore, in the system shown, even when the power supply 102 of the target system 100 is turned off, register settings and the like can be held, waiting until the power supply 102 is again turned on.

In the example shown in FIG. 9, the debug target circuit 4 and the debugging circuit 5 are connected by a number of dedicated buses 31: one 314 for a reset signal of the debug target circuit 4, one 315 for a clock signal, one as a trace data bus 316 for tracing a CPU action in the debug target circuit 4, one as a command bus 317 to be used for execution of an emulator program at a CPU 41, one as a data bus 318, and one 319 for a break demand signal such as a command break. Such various signals are connected to the clip circuit 91.

Figure 10:
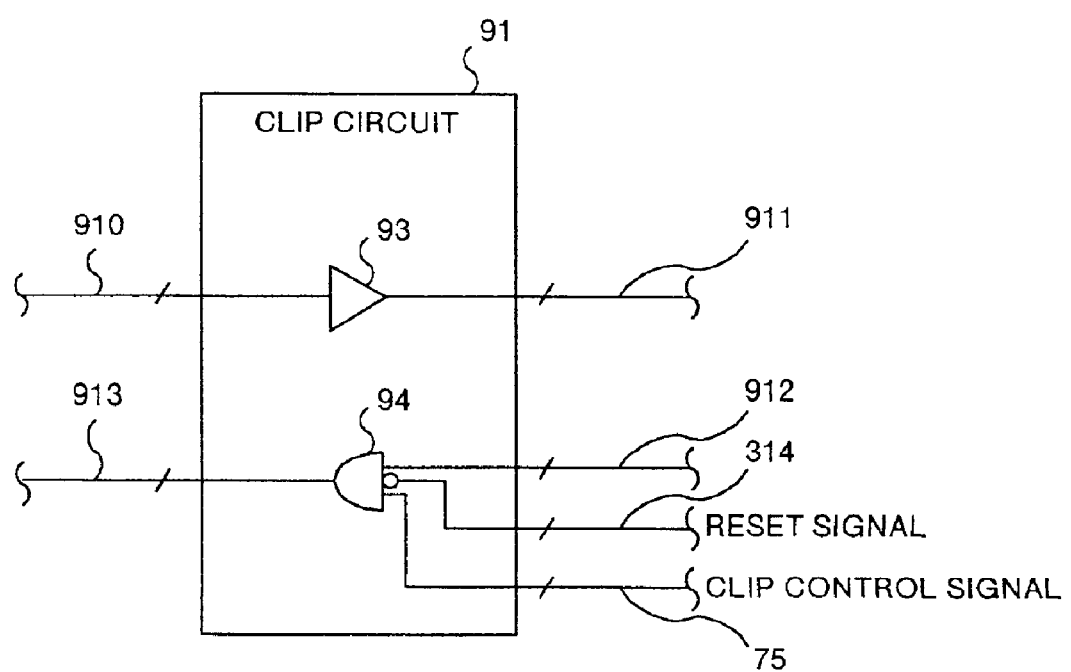
FIG. 10 is a circuit diagram of a clip circuit of the debugging microcomputer of FIG. 9.

FIG. 10 is a circuit diagram showing arrangement of the clip circuit 91. Like the clip circuit 71 shown in FIG. 8, the clip circuit 91 has an output buffer 93 for buffering an output signal of the debugging circuit 5 and a clip cell 94 for clipping an input signal of the debugging circuit 5, respectively multiplied in number as necessary for a number of dedicated buses 31 provided. In FIG. 10, designated by reference character 911 is a respective of various output signals 910 of the debugging circuit 5, as it is buffered by the output buffer 93, and 913 is a respective one of various reception signals 912 of the debugging circuit 5, as it is subjected to the clip cell 94, to be an output signal of the clip circuit 91.

The clip cell 94 has, as inputs thereto, the various reception signals 912 of the debugging circuit 5, clip control signals, and reset signals 314 of the debug target circuit 4. In other words, the clip cell 94 depends on both the clip control signals and the reset signals 314 of the debug target circuit 4, for controlling the various reception signals 912 of the debugging circuit 5 to pass through as they are or to be clipped at a low level.

Figure 11:
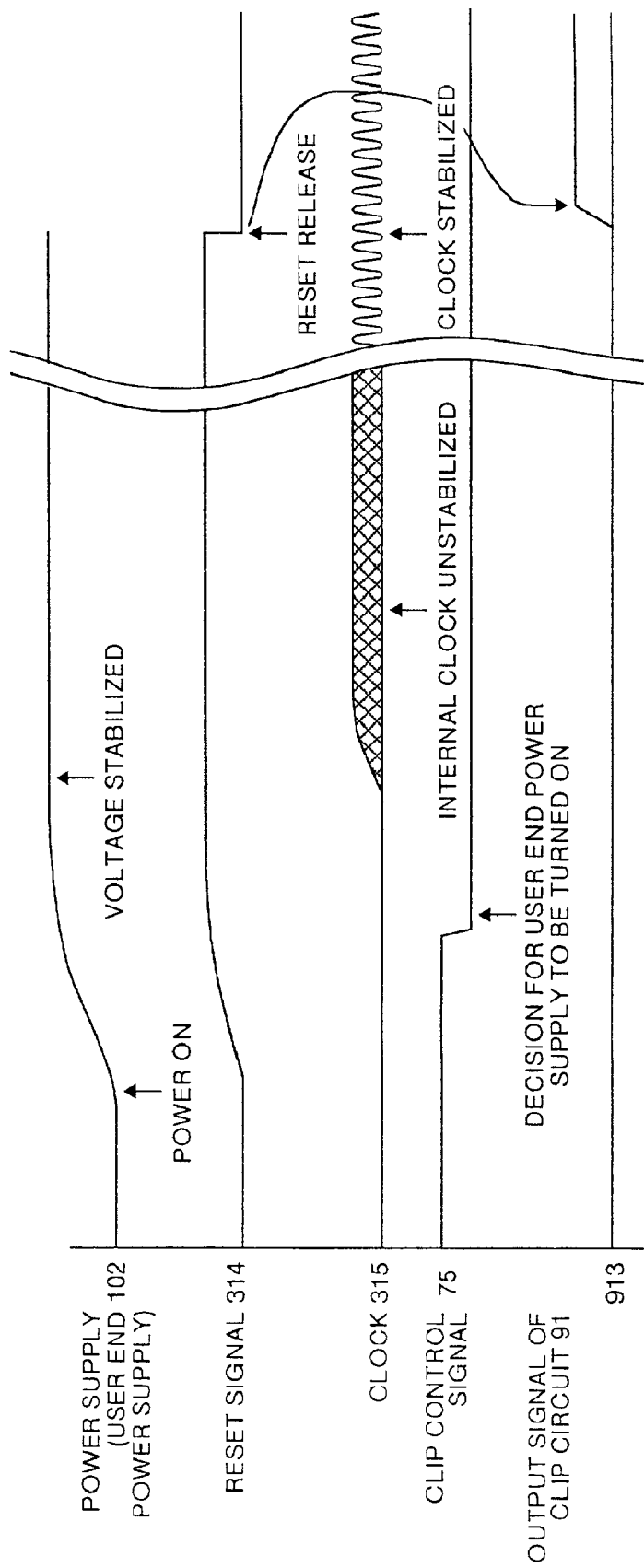

Actions will now be explained upon power supply throw-in of the target system 100 including the debugging microcomputer 9, as they occur after completion of whole debug settings in the debugging circuit 5. First, the power supply 102 is turned off after completion of the debug settings. At this time, the power supply monitoring IC detects the power supply 102 being turned off, to thereby ascertain the clip control signal. Thereby, the clip circuit 91 prevents those output signals of the debug target circuit 4 which have uncertain signal levels, from being input to the debugging circuit 5. In this condition, the power supply 102 is turned on, to start actions of whole circuits including the debug target circuit 4. FIG. 11 shows associated sequential actions.

As shown in FIG. 11, by turning the power supply 102 on, an output voltage of the power supply 102 is gradually increased in dependence on a time constant. As the output voltage has reached a constant level, a clip control signal output from the power supply monitoring IC is negated. In this stage, however, because a clock supply to the debug target circuit 4 is still unstable, it so follows that an external rest is applied until the clock supply becomes stable or that, by provision of an internal counter, a rest state is maintained up to a time the clock will be stabilized. During the reset state, the clip circuit 91 is kept active by the reset signal 314, whereas the CPU 41 in the debug target circuit 4 does not start its action in the reset, thus involving no problem.

When the clock supply of the debug target circuit 4 is stabilized, the resetting of the debug target circuit 4 is canceled. In synchronism therewith, the reset signal 314 is negated, and the clipping at the input clip circuit 91 is canceled. It is thereby enabled to acquire a trace list of the CPU 41 in the debug target circuit 4 that has started an action with the reset release, or to apply a break from the debugging circuit 5 relative to a rest vector fetch of the CPU 41 as well as to a fetch of a heading command of the initializing routine.

Figure 12:
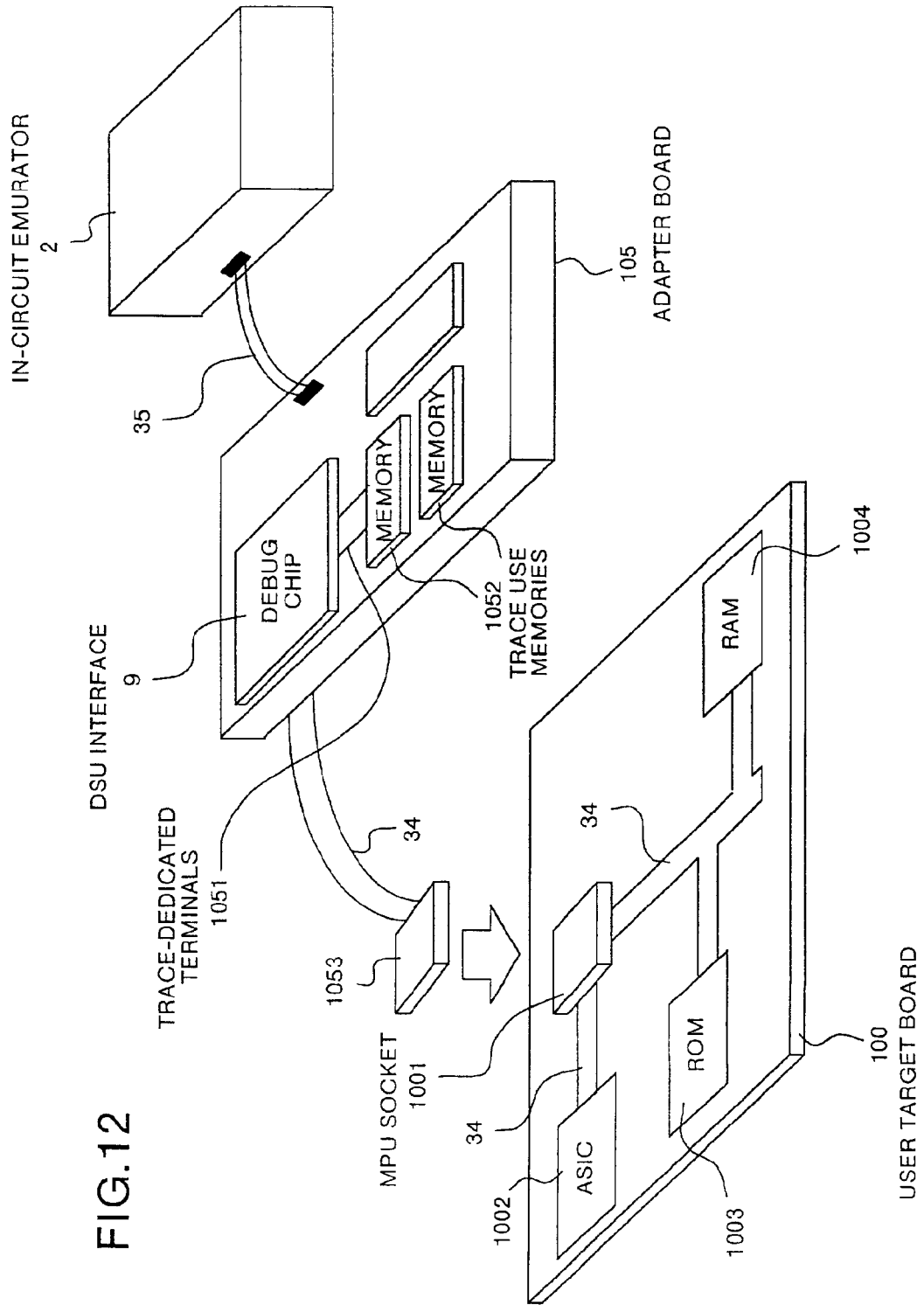
FIG. 12 is a schematic perspective view of an entire arrangement of the system of FIG. 9.

FIG. 12 and FIG. 13 are schematic views of respective entirety of exemplary arrangements of the system of FIG. 9. The exemplary arrangement shown in FIG. 12 employs a combination of a device provided with trace-dedicated terminals and external trace use memories. In FIG. 12, designated by reference character 1051 are the trace-dedicated terminals, and 1052 are the external trace use memories. Further, a debugging chip, a user target board, and a DSU interface in FIG. 12 correspond to the debugging microcomputer 9, the target system 100, and the tool bus 35 in FIG. 9, respectively. The external trace use memories 1052 are connected via the trace-dedicated terminals 1051 to the debugging chip, i.e., the debugging microcomputer 9.

The adapter board 105 is connected to the user target board by inserting an MPU section 1053, which is connected to the adapter board 105 via an external bus 34 extending from the adapter board 105, to the user target board, i.e., to an MPU section socket 1001 of the target system 100. It is noted that the user target board has applications thereon such as an ASIC 1002, a ROM 1003, and a RAM 1004 connected via the external bus 34 on the user target board.

The exemplary arrangement shown in FIG. 13 employs a device free of trace-dedicated terminals. There is used in this example a trace memory in the debugging microcomputer 9. The remaining arrangement is analogous to the example shown in FIG. 13. It is noted that, in both FIG. 12 and FIG.

13, a power supply monitoring IC applied to the adapter board 105 is omitted.

According to the embodiment/s described, because of independent supply of drive power to a debug target circuit 4 and a debugging circuit 5 of a debugging microcomputer 3, 6, 7, 8, or 9, the supply of drive power to the debug target circuit 4 can be stopped, while keeping the debugging circuit 5 active by supplying drive power to the debugging circuit 5. In other words, after settings to be made of various debug information such as of a tracing function and a breaking function by an in-circuit emulator 2 with drive power supplied to both the debug target circuit 4 and the debugging circuit 5, even if only the drive power to the debug target circuit 4 is stopped, the various debug information can be held in the debugging circuit 5. Therefore, by restarting supply of drive power to the debug target circuit 4, the debug information held in the debugging circuit 5 can be based on to perform a debug just after power supply throw-in.

Further, when the drive power to the debug target circuit 4 is stopped after a setting of various debug information, because a signal to be supplied from the debug target circuit 4 to the debugging circuit 5 is clipped by a clip circuit 71 or 91, the signal to be unstable in potential level can be kept from being supplied from the debug target circuit 4 to the debugging circuit 5. It therefore is possible to prevent the debugging circuit 5 from taking erroneous actions due to a signal output from the debug target circuit 4 with an uncertain potential level, when the supply of drive power to the debug target circuit 4.

According to one aspect of the present invention, because of independent supply of drive power to a debug target circuit and a debugging circuit of a debugging microcomputer, after the supply of drive power to the debug target circuit is once stopped while various debug information in the debugging circuit is held as it is, the supply of drive power to the debug target circuit can be restarted, allowing for a debug to be performed just after power supply throw-in in dependence on the debug information held in the debugging circuit.

Further, because of provision of a clip circuit for clipping a signal to be supplied with an uncertain potential level from a debug target circuit to a debugging circuit when supply of drive power to the debug target circuit is stopped, the debugging circuit is kept from taking erroneous actions when the supply of drive power to the debug target circuit is stopped.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A microcomputer with a debug supporting function in which a program to be executed by a CPU is debugged using an in-circuit emulator, the microcomputer comprising:
    a debug target circuit which has the CPU and in which supply and stop of drive power can be arbitrarily switched:
    a debugging circuit which has an interface module to the in-circuit emulator and which holds a debug related setting by drive power supplied in a condition in which power supply to the debug target circuit is stopped; and
    a clip circuit which clips a supply signal from the debug target circuit to the debugging circuit when supply of drive power to the debug target circuit is stopped.

2. The microcomputer according to claim 1, further comprising a clip control terminal to which is supplied, from outside, a control signal to switch the clip circuit in accordance with, selectively, directly supplying an output signal of the debug target circuit to the debugging circuit or clipping the output signal of the debug target circuit.

3. The microcomputer according to claim 1, wherein the clip circuit is switched, selectively, to directly supply an output signal of the debug target circuit to the debugging circuit or to clip the output signal of the debug target circuit, in response to drive power supplied to the debug target circuit.

4. The microcomputer according to claim 1, wherein the microcomputer is a microcontroller or a microprosessor.

5. A microcomputer with a debug supporting function in which a program to be executed by a CPU is debugged using an in-circuit emulator, the microcomputer comprising:
    a debug target circuit which has the CPU;
    a debugging circuit which has an interface module to the in-circuit emulator;
    a first power supply terminal which supplies an external drive power to the debug target circuit;
    a second power supply terminal which supplies an external drive power to the debugging circuit independently of power supply to the debug target circuit; and
    a clip circuit which clips a supply signal from the debug target circuit to the debugging circuit when supply of drive power to the debug target circuit is stopped.

6. The microcomputer according to claim 5, further comprising a clip control terminal to which is supplied, from outside, a control signal to switch the clip circuit in accordance with, selectively, directly supplying an output signal of the debug target circuit to the debugging circuit or clipping the output signal of the debug target circuit.

7. The microcomputer according to claim 5, wherein the clip circuit is switched, selectively, to directly supply an output signal of the debug target circuit to the debugging circuit or to clip the output signal of the debug target circuit, in response to drive power supplied to the debug target circuit.

8. The microcomputer according to claim 5, wherein the microcomputer is a microcontroller or a microprosessor.

9. A microcomputer with a debug function in which a program to be executed by a CPU is debugged using an in-circuit emulator, the microcomputer comprising:
    a debug target circuit which has the CPU;
    a debugging circuit which has an interface module to the in-circuit emulator;
    a power supply terminal which supplies an external drive power to the debugging circuit;
    a switching element which switches supply and stop of the external drive power supplied through the power supply terminal to the debug target circuit;
    a switch control terminal to which a control signal for controlling the switching of the switching element is supplied from outside; and
    a clip circuit which clips a supply signal from the debug target circuit to the debugging circuit when supply of drive power to the debug target circuit is stopped.

10. The microcomputer according to claim 9, further comprising with a clip control terminal to which is supplied, from outside, a control signal to switch the clip circuit, selectively, directly supplying an output signal of the debug target circuit to the debugging circuit or clipping the output signal of the debug target circuit.

11. The microcomputer according to claim 9, wherein the clip circuit is switched, selectively, to directly supply an output signal of the debug target circuit to the debugging circuit or to clip the output signal of the debug target circuit, in response to drive power supplied to the debug target circuit.

12. The microcomputer according to claim 9, wherein the microcomputer is a microcontroller or a microprosessor.

* * * * *